(12) United States Patent
Kee

(10) Patent No.: US 7,187,786 B2
(45) Date of Patent: Mar. 6, 2007

(54) METHOD FOR VERIFYING USERS AND UPDATING DATABASE, AND FACE VERIFICATION SYSTEM USING THE SAME

(75) Inventor: Seok-cheol Kee, Kyungki-do (KR)

(73) Assignee: Samsung Electronics Co., Ltd., Suwon (KR)

( * ) Notice: Subject to any disclaimer, the term of this patent is extended or adjusted under 35 U.S.C. 154(b) by 731 days.

(21) Appl. No.: 10/419,742

(22) Filed: Apr. 22, 2003

(65) Prior Publication Data

US 2003/0198368 A1 Oct. 23, 2003

(30) Foreign Application Priority Data

Apr. 23, 2002 (KR) ............................... 2002-22215

(51) Int. Cl.
*G06K 9/00* (2006.01)
(52) U.S. Cl. ...................... 382/118; 382/190; 382/224; 382/296; 706/20
(58) Field of Classification Search ................ 382/118, 382/124, 127, 159, 190, 225, 170, 226, 227, 382/245, 296, 224; 378/98.2; 704/232, 704/273, 246, 231; 713/186; 706/20
See application file for complete search history.

(56) References Cited

U.S. PATENT DOCUMENTS

| | | | |
|---|---|---|---|
| 5,497,430 A | | 3/1996 | Sadovnik et al. |
| 5,680,481 A | * | 10/1997 | Prasad et al. ............... 382/190 |
| 5,870,138 A | * | 2/1999 | Smith et al. ................ 348/143 |
| 5,982,912 A | * | 11/1999 | Fukui et al. ................ 382/118 |
| 6,128,398 A | * | 10/2000 | Kuperstein et al. ......... 382/118 |
| 6,254,559 B1 | * | 7/2001 | Tyrrell ......................... 602/16 |
| 6,928,231 B2 | * | 8/2005 | Tajima ......................... 386/46 |

OTHER PUBLICATIONS

European Search Report.
S. Akamatsu.: "Computer Recognition of Human Face-A Survey", Systems & Computers in Japan, Scripta Technica Journals, Sep. 1999, pp. 76-89, vol. 30, No. 10, New York.
A. Shashua et al.: "The Quotient Image: Class-Based Re-Rendering and Recognition with Varying Illuminations", IEEE Transactions on Pattern Analysis and Machine Intelligence, Feb. 2001, pp. 129-139, vol. 23, No. 2, New York.
Li-An Tang et al.: "Face Recognition Using Synthesized Intermediate Views", IEEE Proceedings of the 38th Midwest Symposium on Circuits and Systems, Rio de Janeiro, Brazil, Aug. 13-16, 1995, pp. 1066-1069, vol. 2, New York.

(Continued)

*Primary Examiner*—Sheela Chawan
(74) *Attorney, Agent, or Firm*—Buchanan Ingersoll & Rooney PC

(57) ABSTRACT

To reduce degradation of recognition performance due to eye detection errors during face verification and to overcome a problem in that sufficient data to design an optimum feature classifier cannot be obtained during face registration, a method includes shifting the positions of eyes detected during face registration in predetermined directions by a predetermined distance to generate pairs of new coordinate points of the eyes; normalizing a face image on the basis of each pair of new coordinate points of the eyes; using the results of normalization in teaching a feature classifier, thereby coping with eye detection errors. In addition, two threshold values are used to prevent a database from being updated with a face of an unregistered person and to update the database with a normal client's face image that has been used during the latest face verification.

20 Claims, 7 Drawing Sheets

OTHER PUBLICATIONS

Bernd Heisele et al.: "Component-based Face Detection", Proceedings IEEE Conference on Computer Vision and Pattern Recognition, Kauai, Hawaii, Dec. 8-14, 2001, and Proceedings IEEE Conference on Computer Vision and Pattern Recognition, Los Alamitos, CA, IEEE Comp. Soc. US, pp. 657-660, vol. 1 of 2.

Shiguang Shan et al.: "Review the Strength of Gabor Features for Face Recognition from the Angle of its Robustness to Mis-alignment", IEEE, Proceedings of the 17th International Conference on Pattern Recognition, Cambridge, UK, Aug. 23-26, 2004, pp. 338-341, vol. 1, Piscataway, NJ.

* cited by examiner

METHOD FOR VERIFYING USERS AND UPDATING DATABASE, AND FACE VERIFICATION SYSTEM USING THE SAME

CROSS-REFERENCE TO RELATED APPLICATIONS

This application claims the priority of Korean Patent Application No. 2002-22215, filed on Apr. 23, 2002, which is incorporated herein in its entirety by reference.

BACKGROUND OF THE DISCLOSURE

1. Field of the Invention

The present disclosure relates to method and system for verifying a face using a method of automatically updating a database.

2. Description of the Related Art

In the 21st century information-based society, information on particular organizations as well as personal information can have a higher value than any other property. In order to protect this important information, various types of password techniques are used, and other techniques for verifying identity are desperately desired. Social demand for verifying identity for use of, for example, credit cards, cash cards, and electronic resident cards is increasingly extended. However, since there is no other auxiliary way of verifying identity than using passwords at present, many social problems including computer crimes have occurred. Recently, biometrics techniques for verifying identity using biometric information such as a fingerprint, iris, face, and the shape of a vein have attracted attention as a method for overcoming the problems.

Among these biometrics techniques, face verification techniques have been evaluated as the most convenient and competitive identity verification methods because a user does not need to take particular action but is just required to look at a camera, and moreover a user's identity can be verified while the user does not recognize it. In addition to simple identity verification, face verification techniques have various applications such as terminal access control, control system on a public place, electronic album, and face recognition for identifying criminals and thus are evaluated as having far-reaching effects in the information society.

Generally, identity verification methods using biometrics techniques largely include two steps of: registering a user's biometric information; and verifying the user's identity.

In order to use a general face verification system, a user first needs to register his/her face in the face verification system. In order to register the face, the user inputs image data including his/her face into the face verification system using a camera. Only a face region is automatically detected from the entire input image. Thereafter, recognition features are extracted from the detected face region, and the values of the recognition features are calculated. Since a face image has a large amount of information and sensitively reacts to changes in facial expression, aging, light, and size, features values that express the features of a face with a small amount of information and are irrelevant to various changes of the face are required. The extracted feature values are used to learn a feature classifier and are stored in a face image database to be used for face verification.

The face verification step using the face verification system is performed in a similar manner to the face registration step. However, in the face verification step, after extracting feature values for a face input for verification, the feature values are compared with feature values stored in the database to verify whether the face that is an object of verification has been registered.

In verifying a face using an existing face verification apparatus according to the above-described conventional method, since a face detector used in both face registration step and face verification step has low resolution, a recognition ratio decreases due to face detection errors. Particularly, an error in the detection of eye position results in considerable degradation of performance of the final face recognition result.

The influence of eye-position detection error will be described with reference to FIG. 1. The results of detecting the position of eyes from two different images input from the same person are shown on the left and the right. After normalizing the two images on the basis of the detected positions of eyes according to a method to be described later, the right image is subtracted from the left image, that is, pixel values of the right image are subtracted from the corresponding pixel values of the left image. If the eye positions between the two images are exactly the same and thus the corresponding pixel values between the two images are the same, the resultant image of the subtraction, i.e., a difference image, is shown in black. If the eye positions are not the same and the corresponding pixel values are not the same, the difference image is shown in white. Accordingly, as a white portion of the difference image gets thicker or increases, the probability of face recognition error increases.

As shown in FIG. 1, a so slight eye detection error that is difficult to be recognized by people changes the result of normalizing a face region, and the degree of an error can be inferred from a difference image obtained from normalized images.

In addition to an eye-position detection error, many other factors may cause degradation of face recognition performance. General face recognition performance can be improved by designing an optimal feature classifier by inputting sufficient learning images. However, if the convenience of users is considered practically, it is impossible to obtain sufficient learning images to design an optimal feature classifier when users register their faces.

The influence of the number of learning images on designing a feature classifier will be described with reference to FIG. 2. FIG. 2 shows the hyperplanes of feature classifiers that are learned through three learning data and five learning data, respectively, per class in order to identify each class, that is, space for a single person in a face feature vector space. Here, the three or five learning data are face images acquired from different viewpoints.

Referring to FIG. 2, the position of the hyperplane of the feature classifier using only three face images per person changes when two more learning images are added. A classifier cannot be effectively designed for a space that cannot be expressed with a small number of learning images. However, if the number of learning images increases, the space can be designed in detail. In other words, as a feature classifier is taught through more learning data including various changes, the reliability of the feature classifier increases. Accordingly, the more learning images are acquired in a user registration step, the better the system performance. However, requiring users to register several tens of face images in order to operate a face verification system causes much inconvenience.

SUMMARY OF THE DISCLOSURE

To solve the above-described problems, it is a first object of the present disclosure to provide face verification method and system in which image data generated considering errors, which may occur due to a change in an eye position during eye detection at an early stage of face detection, is previously registered, thereby preventing recognition performance from decreasing due to a face detection error.

It is a second object of the present disclosure to provide face verification method and system in which the number of learning data is increased by putting image data, which is normalized in accordance with each pair of coordinates of eyes that are generated from a change in an eye position, in learning image data that is used to learn a feature classifier so that an optimal feature classifier can be designed, thereby preventing recognition performance from decreasing.

It is a third object of the present disclosure to provide face verification method and system in which a face image that is input for face verification is used to learn a feature classifier so that the face image can be used in verifying the face afterwards and in which a face database is automatically updated.

To achieve one or more objects of the present disclosure, there is provided a face verification system including a face region detector for separating a background and a face from an input face image to detect a user's face region; an eye-position shift unit for detecting the positions of eyes from the detected face region and shifting the detected positions of eyes in predetermined directions by a predetermined distance, thereby generating new coordinate points of the eyes; a face region normalizer for normalizing the face region on the basis of the new coordinate points of the eyes; a recognition feature extractor for extracting recognition features from the normalized face regions and calculating feature values; a feature classifier teacher for teaching a feature classifier using the calculated feature values; a database for storing the calculated feature values; and a determiner for determining whether the input face image is similar to any face image registered in the database based on the feature values and determining whether to update the database using the input face image.

In one embodiment, there is also provided a method of verifying a face in a face verification system. The method includes (a) separating a background and a face from an input face image to detect a user's face region; (b) detecting the positions of eyes from the detected face region and shifting the detected positions of eyes in predetermined directions by a predetermined distance, thereby generating new coordinate points of the eyes; (c) normalizing the face region on the basis of the new coordinate points of the eyes; (d) extracting recognition features from the normalized face regions and calculating feature values; (e) teaching a feature classifier using the feature values and storing the feature values in a database; (f) detecting a face region from the input face image for verification, normalizing the face region, extracting recognition features of a face, and calculating feature values; and (g) determining whether the input face image is similar to any face image registered in the database based on the feature values and determining whether to update the database using the input face image.

Step (g) includes calculating the distribution of the calculated feature values in a vector area using the feature classifier and determining whether the input face image is similar to any face image registered in the database based on a comparison value which numerically expresses the distribution of the calculated feature values, and rejecting the user if the comparison value is equal to or less than a first threshold value and accepting the user if the comparison value is greater than the first threshold value.

BRIEF DESCRIPTION OF THE DRAWINGS

The above objects and advantages of the present disclosure will become more apparent by describing in detail preferred embodiments thereof with reference to the attached drawings in which.

DETAILED DESCRIPTION OF THE DISCLOSURE

Hereinafter, embodiments of the present disclosure will be described in detail with reference to the attached drawings.

Figure 1:
FIG. 1 illustrates the influence of eye-position detection error in a conventional face verification apparatus.
Figure 2:
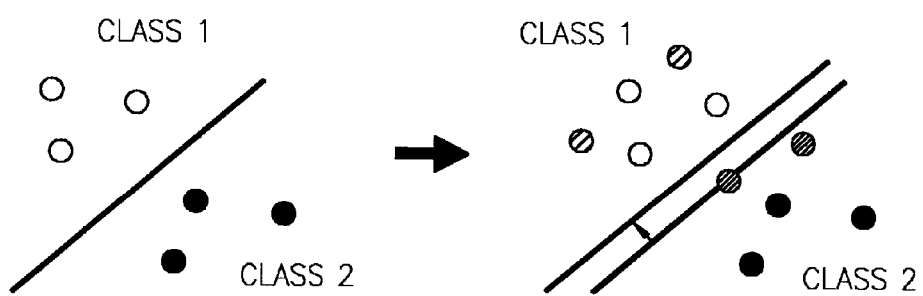
FIG. 2 shows examples of designs of a conventional feature classifier according to the amount of learning images.
Figure 3:
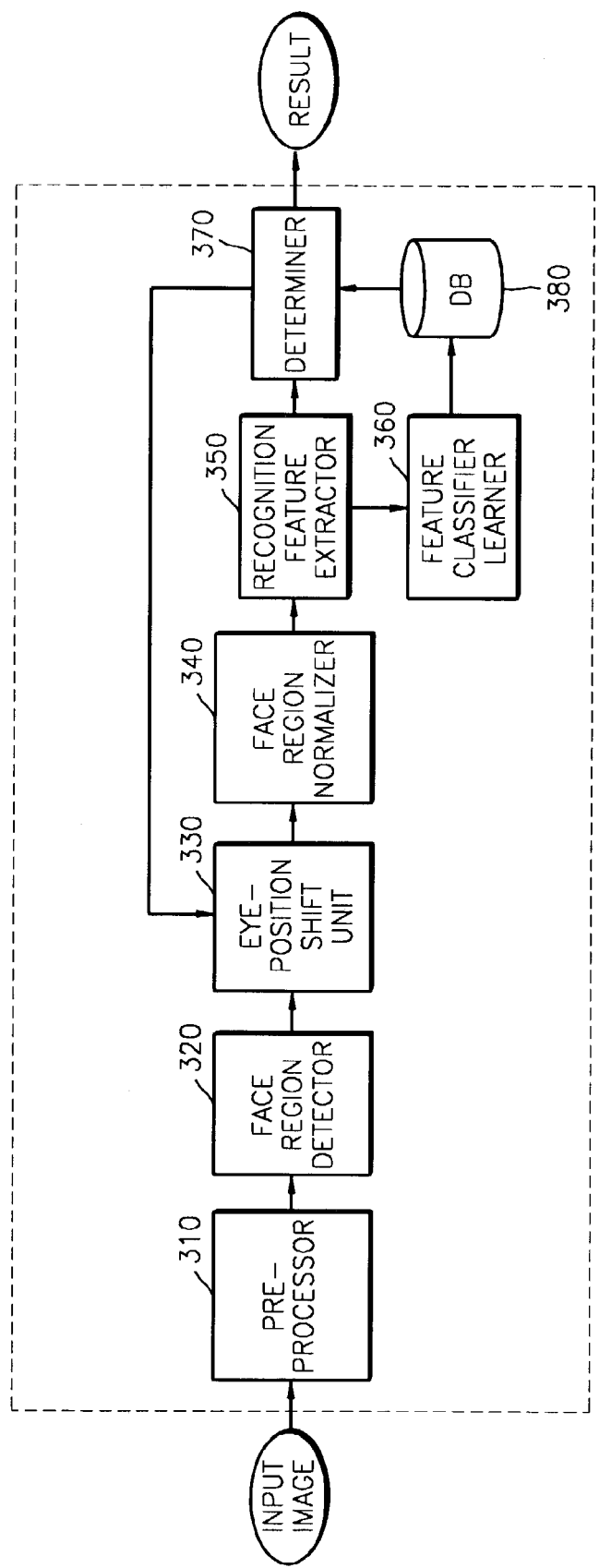
FIG. 3 is a block diagram of a face verification system according to an embodiment of the present disclosure.

FIG. 3 is a block diagram of a face verification system according to an embodiment of the present disclosure. The face verification system includes a preprocessor 310 for processing an input image to have a suitable digital signal format to image processing; a face region detector 320 for separating a background and a face region from the input image; an eye-position shift unit 330 for detecting the positions of eyes from the input image and moving the coordinates of the eyes in a predetermined direction by a predetermined distance so as to generate a pair of eye coordinates taking into account an eye detection error; a face region normalizer 340 for decreasing the influence of light or size of the face image in accordance with the pair of coordinates of the eyes whose positions have been shifted; a recognition feature extractor 350 for extracting recognition features of the face and calculating feature values; feature classifier teacher 360 for learning a feature classifier using the calculated face recognition feature values, that is, feature classification data; a determiner 370 for comparing a face feature value extracted from an input face image for verification with registered face feature values to determine whether the input face image is similar to a registered face image; and a database (DB) 380 for storing the face feature values and the feature classification data used to learn the feature classifier in the feature classifier teacher 360.

Figure 4:
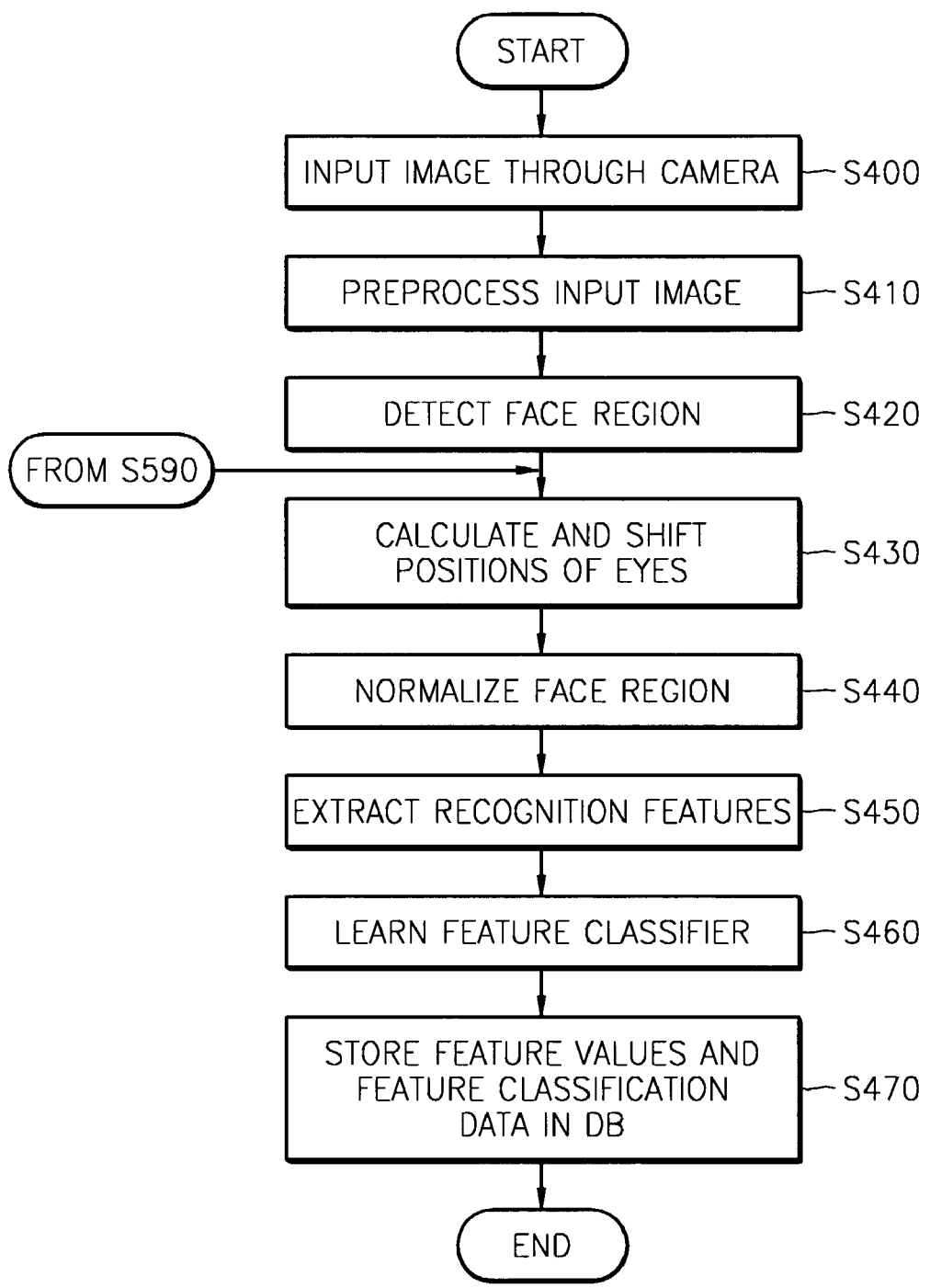
FIG. 4 is a flowchart of a procedure for registering a user face in a face verification system according to an embodiment of the present disclosure.

A method of registering face data in a face verification system according to the present disclosure will be described with reference to FIGS. 3 and 4.

In order to use a face verification system according to the present disclosure, a user needs to register his/her face in the face verification system. The user's face is usually picked up by a low-resolution camera and is input into the face verification system in step S400.

The preprocessor 310 receives an input image from the camera, removes noise from the input image so that a face region can be easily extracted, and converts the format or color type of the input image into a format which can be processed by the face verification system of the present disclosure in step S410.

The face region detector 320 separates a face region and a background from the preprocessed input image to detect the face region in step S420. It is necessary to accurately detect the face region from the input image in order to accurately verify the user's face. However, since the face is distorted by, for example, facial expression or illumination, and is largely changed by, for example, hair style, makeup, or glasses, it is difficult to completely separate the face region from the background. In order to detect a face region from a two-dimensional image, a method using geometrical characteristics of a face, a statistical analysis, a method using a neural network, a method using a principal component analysis, or a method using an isolated region can be used.

The eye-position shift unit 330 shifts the position of the eyes in a predetermined direction by a predetermined distance in the detected face region and outputs the shifted result to the face region normalizer 340 in step S430.

In a general method of recognizing and verifying a face, the positions of eyes are detected in a given image, and the coordinates of a center point between the eyes are found from the coordinates of the eyes. Thereafter, the face image is normalized on the basis of the center point between two eyes by methods that will be described later. Recognition features are extracted from the normalized image, and the features are registered and used to verify the face.

Since the face region detector 320 has limitation in performance, it is nearly impossible to find the correct center point between two eyes in all images. Accordingly, an error may occur when the positions of eyes are detected from a face image. The error results in degradation of recognition performance.

In the present disclosure, the eye positions detected from the input image are shifted in a predetermined direction by a predetermined distance by the eye-position shift unit 330. On the basis of a pair of coordinates of the position-shifted eyes, the input image is normalized by the methods that will be described later. Recognition features are extracted from the normalized image data, and a feature classifier is learned using the recognition features so that the above-described problems can be overcome.

Figure 6:
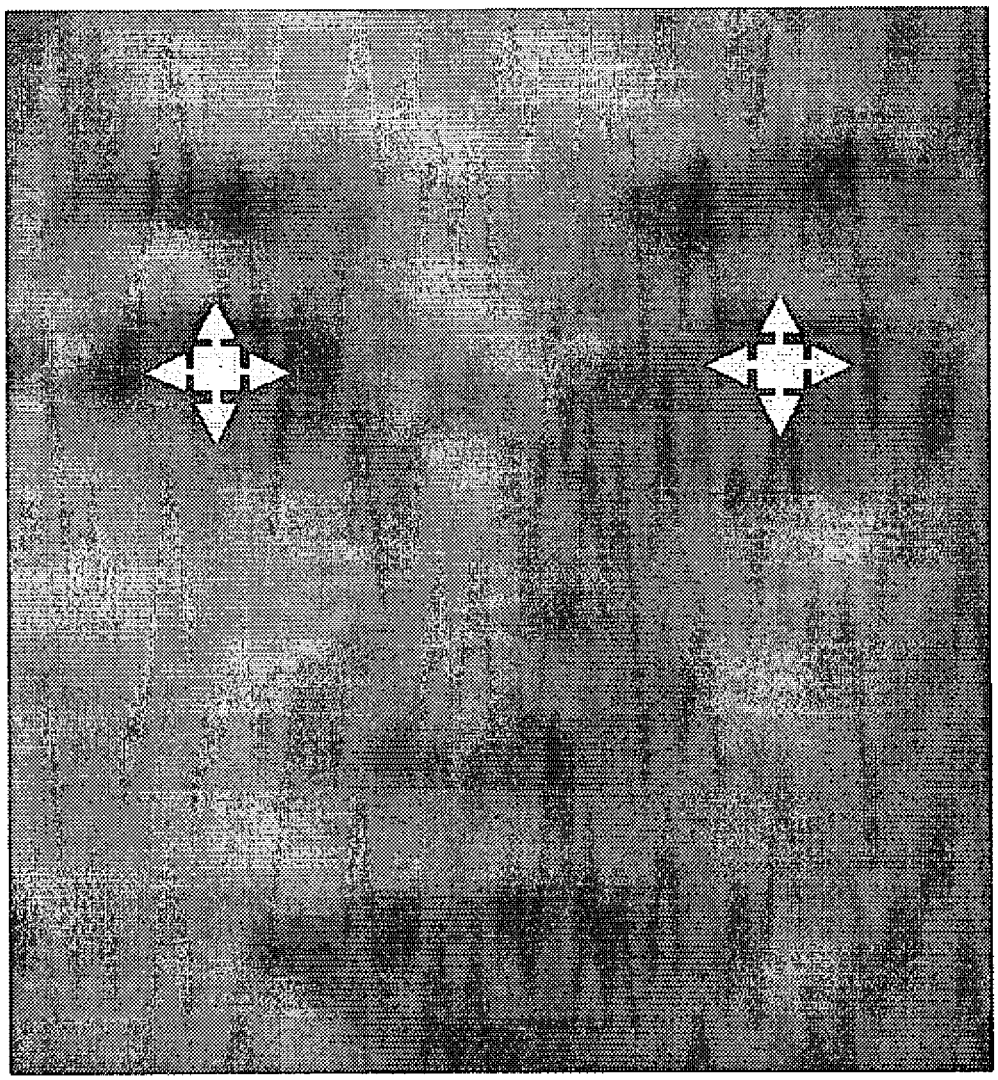
FIG. 6 shows an example of directions in which an eye position is shifted according to an embodiment of the present disclosure.

As shown in FIG. 6, the eye-position shift unit 330 detects the positions of two eyes in the input face region, shifts the coordinate point of each eye up, down, to the left, to the right, or in a diagonal direction from the automatically detected coordinate point of the eye by a predetermined distance, and sets and registers new coordinates of the eyes. New coordinates are set according to a rule like $(x,y) \rightarrow (x+x_d, y+y_d)$.

Here, the distances $x_d$ and $y_d$ by which each eye coordinate point is shifted are selected depending on the size of the detected face region. For example, if the horizontal length of the face region is about 30 pixels, the distances $x_d$ and $y_d$ are set to about 2 pixels and can be increased or decreased at a predetermined ratio according to the size of the face region.

More specifically, it is assumed that the positions of left and right eyes that are found through automatic face detection are represented by $(x^l_o, y^r_o)$, new eye coordinates are generated by a predetermined rule on the basis of the detected eye positions that may have detection errors, and new eye positions corresponding to the new eye coordinates are represented by $(x^l_m, y^r_m)$. Here, if s new coordinates are added to the new eye coordinates $(x^l_m, y^r_m)$, new eye coordinate combinations are generated as follows.

$$\begin{bmatrix} (x^l_0, x^r_0) & (x^l_0, x^r_1) & (x^l_0, x^r_2) & \cdots & (x^l_0, x^r_n) \\ (x^l_1, x^r_0) & (x^l_1, x^r_1) & (x^l_1, x^r_2) & \cdots & (x^l_1, x^r_n) \\ (x^l_2, x^r_0) & (x^l_2, x^r_1) & (x^l_2, x^r_2) & \cdots & (x^l_2, x^r_n) \\ \vdots & \vdots & \vdots & & \vdots \\ (x^l_m, x^r_0) & (x^l_m, x^r_1) & (x^l_m, x^r_2) & \cdots & (x^l_m, x^r_n) \end{bmatrix}$$

When the new position of each eye is shifted s times, $(s+1)*(s+1)$ eye coordinate combinations are generated. For example, the new eye coordinates are shifted in four directions, i.e., up, down, to the left, and to the right, five coordinate points are generated for each of the left and right eyes, and the number of combinations of the coordinates of the two eyes is 25. After generating the new eye coordinates, the input image is normalized on the basis of each of the combinations of the new eye coordinates and is then used as a learning image. In other words, 25 learning images, which can be used to cope with eye detection errors, can be obtained from only one input image so that degradation of recognition performance due to eye detection errors can be improved. In addition, a conventional problem of an optimum feature classifier not being designed due to a small number of learning images can be solved.

Verification performance for the image of the face region received from the face region detector 320 is degraded as compared to the registered face image due to a change in illumination, a change in size of a face region according to the distance from a camera, and tilt of an image, etc. Accordingly, the face region normalizer 340 compensates the illumination of the detected face image, rotates the face image to correct the tilt of the face region, and magnifies or reduces the face region to correct the size of the face image, thereby normalizing the detected face region, and outputs the normalized face image to the recognition feature extractor 350 in step 440.

On receiving the normalized face image, the recognition feature extractor 350 extracts the feature values which can be discriminated from others regardless of facial expression and aging in step S450. These features include the shapes and geometrical disposition of major parts of a face such as eyes, nose, and mouth; a direction component of the nose; a ratio of the distance between the pupils of the eyes to a nose length; and a ratio of nose widths. Here, feature points may be found using gradient, or a method using a template, a method using mathematical transform such as principal component analysis (PCA) or local feature analysis (LFA), or a method of finding face elements and features by mapping the modified model to a face can be used.

The feature classifier teacher 360 maps the recognition feature values provided from the recognition feature extractor 350 to a predetermined vector space to teach a feature classifier, i.e., feature classification data, in step S460.

The features values used for learning and the learned feature classification data are stored in the DB 380 in step S470.

Figure 5:
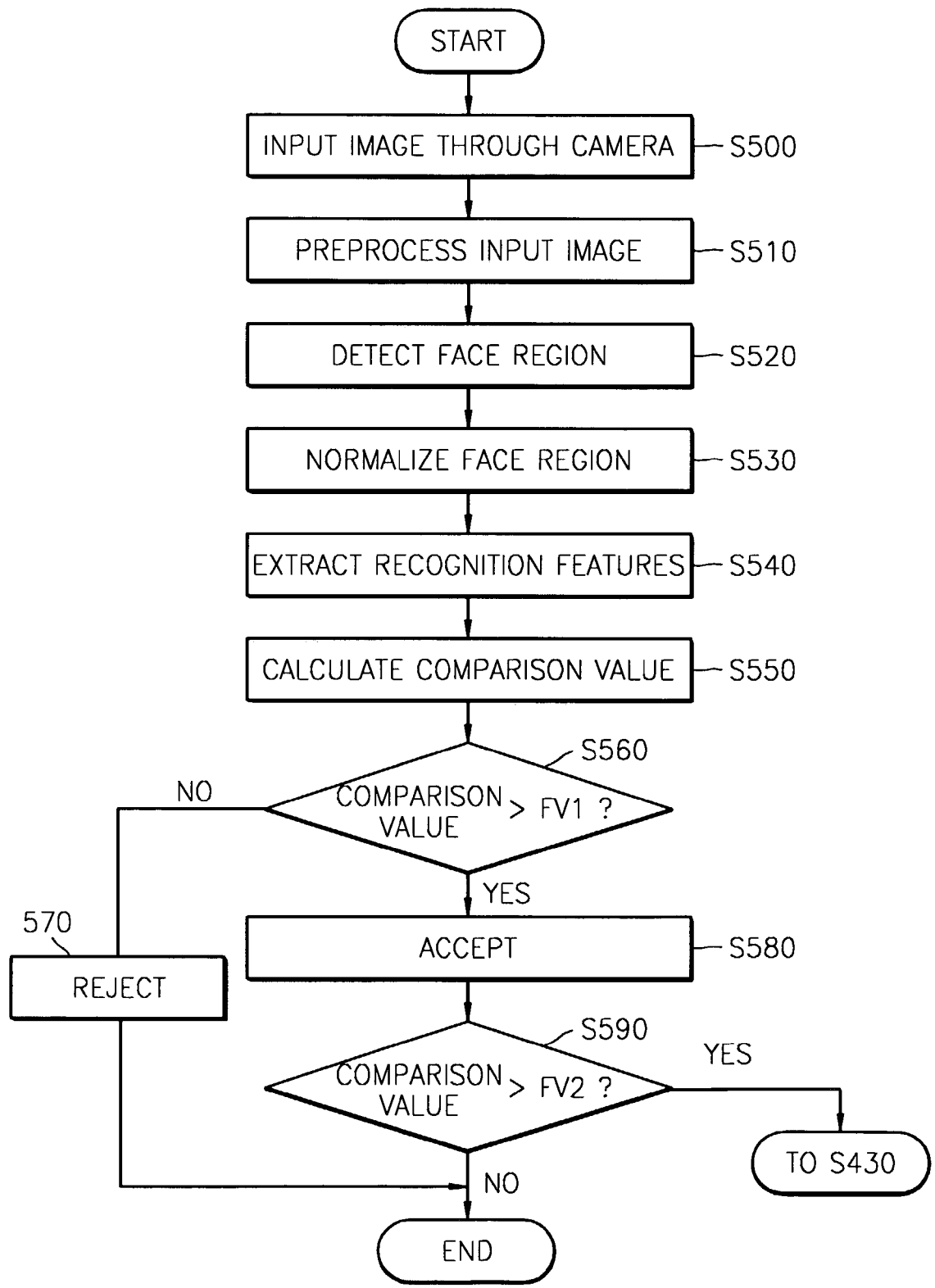
FIG. 5 is a flowchart of a procedure of verifying a face in a face verification system according to an embodiment of the present disclosure.

A method of verifying a face in a face verification system according to the present disclosure will be described with reference to FIGS. 5 and 7B.

If an image is input through a camera in step S500, the image is preprocessed in step S510. A face region is detected from the preprocessed image in step S520. The detected face region is normalized in step S530. Recognition features are extracted from the normalized face region in step S540. The steps S500 through S540 are the same as the steps S400 through 450 in the face registration shown in FIG. 4, with the exception that the shifting of eye positions in step S430 is omitted.

The feature values of a face image for verification are output from the recognition feature extractor 350 to the determiner 370. Then, the determiner 370 calculates the distribution of the feature values, which are extracted from the face image for verification, in a vector area using the learned feature classifier, i.e., the learned feature classification data, which stored in the DB 380 and calculates a comparison value that numerically expresses the vector area distribution of the feature values in step S550.

The determiner 370 compares the calculated comparison value with a previously set first threshold value FV1 in step S560 in order to determine whether to reject or accept the input face image. If the comparison value is equal to or less than the first threshold value FV1, the determiner 370 determines the input face image as an imposter and outputs a result indicating rejection not to allow a user to pass the system in step S570. If the comparison value is greater than the first threshold value FV1, the determiner 370 outputs a result indicating acceptance to approve the user a registered client in step S580.

A method of determining the threshold value will be described with reference to the following formula and FIG. 8. A linear feature classification function is defined by the following formula.

$$f(x) = \text{sgn}(<w^*x> + b)$$

Here, sgn indicates a hyperplane function, w indicates the slope of a hyperplane that is obtained through learning, x indicates a feature value input during face verification, and a bias value b indicates a threshold value for determining whether to reject or accept a face.

Figure 8:
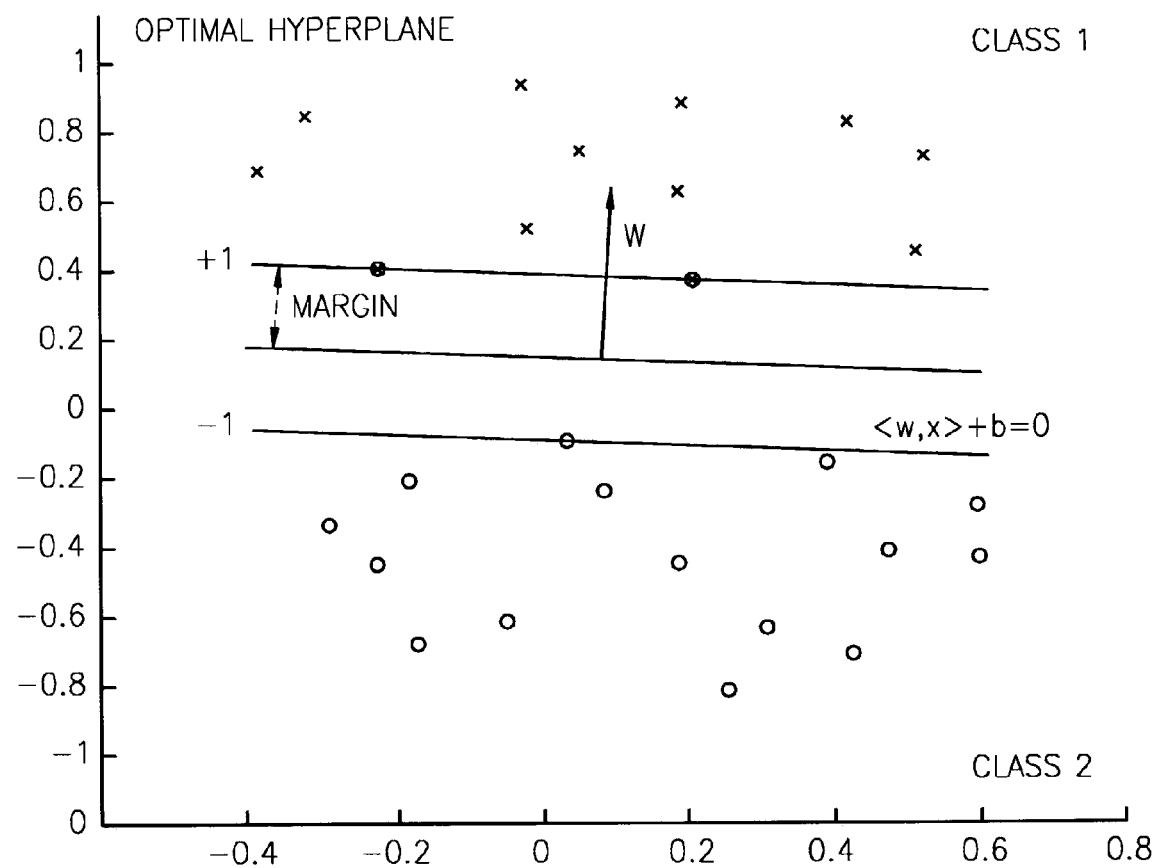
FIG. 8 shows changes in the position of a feature classifier and in a face verification threshold value depending on feature values in a hyperplane according to the present disclosure.

As shown in FIG. 8, when a hyperplane is designed in a direction such that the distance of the nearest feature values from the hyperplane is maximized, an optimum hyperplane can be obtained.

In a hyperplane function $<w^*x>+b=0$, when 0 is defined as a bias value, the position of a threshold value can be changed by changing the bias value. In other words, when a positive bias value greater than 0 is used, the threshold value shifts toward a class 1. When a negative bias value less than 0 is used, the threshold value shifts toward a class 2.

After determining acceptance, the determiner 370 compares the comparison value with a second threshold value FV2, which is previously set in order to determine whether to update the DB 380, in step S590. If the comparison value is greater than the second threshold value FV2, the determiner 370 outputs a control signal to the eye-position shift unit 330 to perform the step S430 so that the DB 380 can be updated with the client's latest face image using the input face image.

The reason two thresholds are set in order to determine whether to update a DB in the present disclosure will be described with reference to FIGS. 7A and 7B.

All biometric verification systems have two types of errors. One is a false acceptance rate (FAR) in which an unregistered person (referred to as an imposter) who disguises himself/herself as a registered client is accepted. The other is a false rejection rate (FRR) in which a user (referred to as a client) who has normally registered his/her face is rejected. A relationship between the two types of errors is shown in FIG. 7B.

Figure 7A:
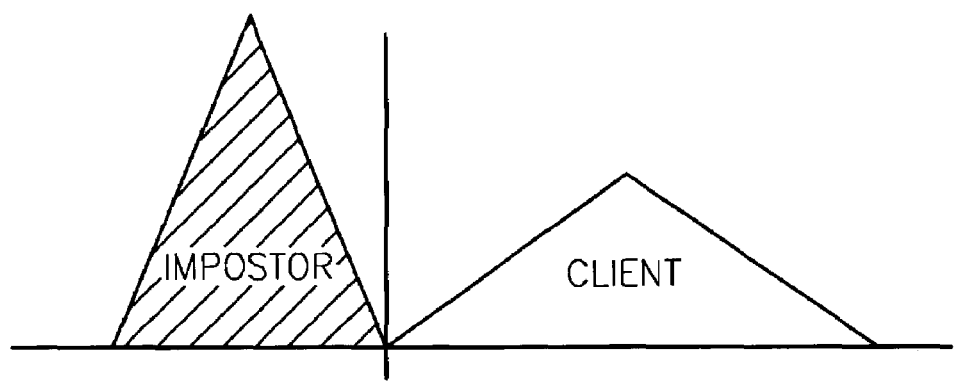
FIG. 7A is a diagram showing the distribution of vector values of ideal image data.

As shown in FIG. 7A, if the vector area distributions of two classes are completely separated from each other and thus the two classes can be separated from each other using a single threshold without errors, no problems occur in a face verification system. However, as shown in FIG. 7B, an overlap area occurs between the two classes, and thus the values of FAR and FRR change depending on a threshold value used for determining whether to reject or accept.

Figure 7B:
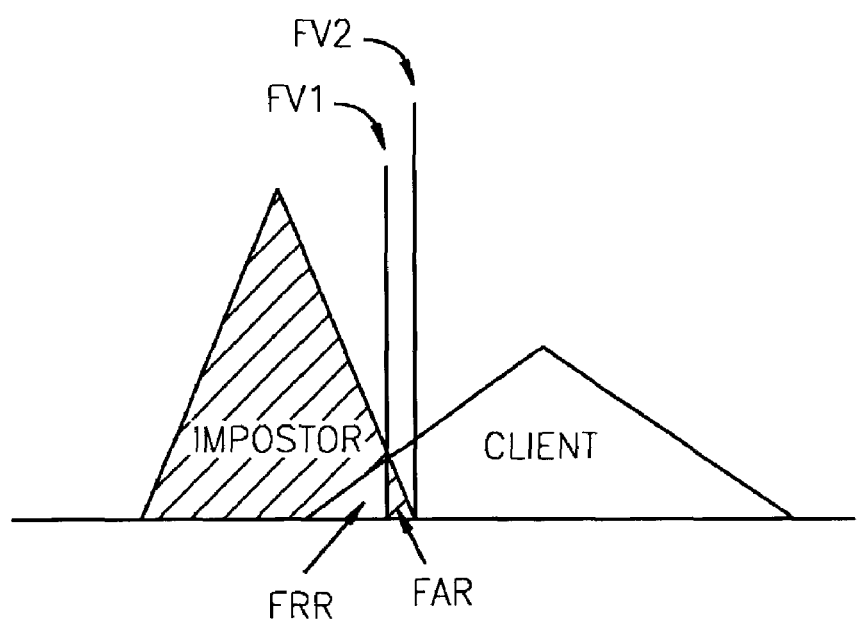
FIG. 7B is a diagram showing an example in which two threshold values are applied taking into account the distribution of vector values of actual image data.

If the second threshold value FV2 is set high such that the FAR becomes zero, as shown in FIG. 7B, in order to prevent impostors from being accepted, although acceptance of impostors can be prevented, the FRR becomes very large. As a result, clients are frequently rejected, causing inconvenience. Accordingly, the first threshold value FV1 is set, as shown in FIG. 7B, such that impostors are accepted at a very low ratio and inconvenience can be much decreased. Therefore, the first threshold value FV1 is set and used to determine whether to reject or accept in the present disclosure.

As described above, it is difficult to obtain sufficient face images of a client when the client registers his/her face in a face verification system. However, after registration, the client frequently uses the face verification system. Accordingly, the face verification system can obtain the client's face image whenever the client passes through the face verification system and thus can build a large amount of learning data. However, if images obtained during verification are used for learning as they are, fatal errors may occur in security. More specifically, if a face image having an FAR is automatically learned and stored in a DB, an impostor who is accepted once can pass through the face verification system at the same acceptance probability as a client. Consequently, a method for automatically using verification images for learning without allowing an FAR is necessarily desired.

In order to overcome this problem, in the present disclosure, the second threshold value FV2 is used to determine whether to update a DB, in addition to the first threshold value FV1. If the comparison value obtained by converting a feature value of an input image for verification into a vector area is greater than the first threshold value FV1 and equal to or less than the second threshold value FV2, only acceptance allowing a user to pass the system is determined. If the comparison value is greater than the second threshold value FV2, in addition to the determination of acceptance, the verification procedure goes to the shifting of eye positions in step S430 so that a feature classifier is learned in the same manner as in the registration procedure and the DB 380 is updated.

Accordingly, two threshold values are used in the present disclosure so that inconvenience is minimized, and a DB is updated with a client's latest face image while preventing the DB from being updated with an impostor's face image, thereby improving the recognition performance of a verification system.

Improved performance of a face verification system according to the present disclosure will be described with reference Tables 1 and 2.

TABLE 1

<Support Vector Machine (SVM)-Sequential Minimum Optimizer (SMO)>

| EER (%) | Shift of eye position | Filtering |
|---|---|---|
| 5.33 | No | No |
| 1.67 | By 2 | No |
| 5.00 | No | Gaussian |
| 1.57 | By 2 | Gaussian |

TABLE 2

<SVM-PCA>

| EER (%) | Shift of eye position | Filtering |
|---|---|---|
| 5.40 | No | No |
| 3.33 | By 2 | No |
| 5.00 | No | Gaussian |
| 2.04 | By 2 | Gaussian |

Tables 1 and 2 show the effects obtained when five face images were used for each of 40 person in a system according to the present disclosure.

First, for 30 persons, three face images were registered per person, and the remaining two face images of each of the 30 persons, i.e., 60 face images, were used to evaluate client accepting performance so as to obtain an FRR. Impostor accepting performance was evaluated 1500 times using five face images per person with respect to 10 persons who were not registered so as to measure an FAR. In Tables 1 and 2, an equal error rate (EER) at which FAR=FRR is shown. Table 1 shows the results of evaluation when only a feature classifier was manifested as an SVM-SMO without using recognition features. Table 2 shows the results of evaluation when PCA was used to extract recognition features and a feature classifier is manifested as an SVM.

It can be inferred from Tables 1 and 2 that verification errors can be reduced to almost half of errors, which occur when positions of eyes are not shifted, by shifting the positions of two eyes.

Face registration and face verification of the present disclosure can be realized as codes which are recorded on a computer readable recording medium and can be read by a computer. The computer readable recording medium may be any type on which data which can be read by a computer system can be recorded, for example, a ROM, a RAM, a CD-ROM, a magnetic tape, a floppy disc, or an optical data storage device. The present disclosure can also be realized as carrier waves (for example, transmitted through Internet). Alternatively, computer readable recording media are distributed among computer systems connected through a network so that the present disclosure can be realized as a code which is stored in the recording media and can be read and executed in the computers.

According to the present disclosure, new eye coordinates are generated by shifting initially detected eye positions in order to cope with face detection errors, a face image is normalized on the basis of the generated new eye coordinates, and face recognition features are extracted, learned, and stored, thereby improving a recognition error which occurs when the eye positions detected during face verification are different from the eye positions registered during face registration. In addition, according to the present disclosure, input image data is normalized on the basis of eye coordinates generated by shifting the positions of eyes of the input image, and the normalized data is used as learning data used for learning a feature classifier so that the number of learning data is increased. Consequently, an optimum feature classifier can be designed, thereby preventing degradation of recognition performance. Moreover, in the present disclosure, two threshold values are used to minimize inconvenience and prevent a DB from being updated with an impostor's face image while using an image input during face verification to update the DB with latest data so that the recognition performance of a verification system can be increased.

The present invention is not limited to the foregoing exemplary embodiments. Variations and modifications will occur to those skilled in the art which are within the scope of the present invention as defined in the claims.

What is claimed is:

1. A method of verifying a face in a face verification system, comprising the steps of:
    (a) separating background and a face from an input face image to detect a face region;
    (b) detecting the positions of eyes from the detected face region and shifting the detected positions of eyes in predetermined directions by a predetermined distance, thereby generating new coordinate points of the eyes;
    (c) normalizing the face region on the basis of the new coordinate points of the eyes;
    (d) extracting recognition features from the normalized face regions and calculating feature values;
    (e) teaching a feature classifier using the feature values and storing the feature values in a database;
    (f) detecting a face region from another input face image for verification, normalizing the face region, extracting recognition features of a face, and calculating feature values; and
    (g) determining whether the input face image is similar to any face image registered in the database based on the feature values.

2. The method of claim 1, wherein step (g) comprises calculating the distribution of the calculated feature values in a vector area using the feature classifier and determining whether the input face image is similar to any face image registered in the database based on a comparison value which numerically expresses the distribution of the calculated feature values.

3. The method of claim 2, wherein step (g) further comprises rejecting the user if the comparison value is equal to or less than a first threshold value and accepting the user if the comparison value is greater than the first threshold value.

4. The method of claim 3, further comprising updating the database with the face image for verification by performing the steps (b) through (d) on the face image for verification when the comparison value is greater than a second threshold value.

5. The method of claim 4, wherein the second threshold value is set to be greater than the first threshold value such that a probability of a user's passing through the face verification system, the user's face image not being stored in the database, is zero, and as the comparison value increases, a probability of the face image for verification agreeing with a face image previously stored in the database increases.

6. The method of claim 4, wherein the second threshold value is determined by $f(x)=\text{sgn}(<w*x>+b)$, wherein sgn indicates a hyperplane function, w indicates the slope of a hyperplane that is obtained through learning, x indicates a feature value input during face verification, and the threshold value is determined by adjusting a bias value b.

7. The method of claim 3, wherein the first threshold A value is determined by $f(x)=sgn(<w*x>+b)$, wherein sgn indicates a hyperplane function, w indicates the slope of a hyperplane that is obtained through learning, x indicates a feature value input during face verification, and the threshold value is determined by adjusting a bias value b.

8. The method of claim 1, further comprising converting the input image into a format suitable for image processing before the step (a).

9. The method of claim 1, wherein the step (c) comprises calculating the center point between each pair of new coordinate points of the eyes and normalizing the face region by compensating for a tilt of the face region on the basis of each center point.

10. The method of claim 1, wherein in step (b) the predetermined distance is determined according to a predetermined ratio of the predetermined distance to a horizontal length of the detected face region.

11. The method of claim 10, wherein the predetermined ratio is 1/15.

12. The method of claim 1, where in step (b) the predetermined directions are four directions, i.e., up, down, to the left, or to the right.

13. A computer readable medium storing a program which carries out the method of claim 1.

14. A face verification system comprising:
  a face region detector for separating background and a face from an input face image to detect a face region;
  an eye-position shift unit for detecting the positions of eyes from the detected face region and shifting the detected positions of eyes in predetermined directions by a predetermined distance, thereby generating new coordinate points of the eyes;
  a face region normalizer for normalizing the face region on the basis of the new coordinate points of the eyes;
  a recognition feature extractor for extracting recognition features from the normalized face regions and calculating feature values;
  a feature classifier teacher for teaching a feature classifier using the calculated feature values;
  a database for storing the calculated feature values; and
  a determiner for determining whether another input face image is similar to any face image registered in the database based on the feature values.

15. The face verification system of claim 14, further comprising a preprocessor for processing the input face image to have a format suitable for image processing and outputting the result of the processing to the face region detector.

16. The face verification system of claim 15, wherein the predetermined ratio is 1/15.

17. The face verification system of claim 14, wherein the eye-position shift unit shifts the detected positions of the eyes in four directions, i.e., up, down, to the left, and to the right, by the predetermined distance in accordance with a predetermined ratio of the predetermined distance to a horizontal length of the detected face region, thereby generating pairs of the new coordinate points of the eyes.

18. The face verification system of claim 14, wherein the determiner calculates a comparison value which numerically expresses the distribution of the feature values, which are extracted from the face image for verification, in a vector area, and compares the comparison value with threshold values, which are set according to the distribution of feature values of previously registered users, to determine whether the input face image is similar to one of the registered face images and whether to update the database.

19. The face verification system of claim 18, wherein the threshold values are determined by $f(x)=sgn(<w*x>+b)$, wherein sgn indicates a hyperplane function, w indicates the slope of a hyperplane that is obtained through learning, x indicates a feature value input during face verification, and the threshold values are determined by adjusting a bias value b.

20. The face verification system of claim 14, wherein the determiner further determines whether to update the database using the input face image.

* * * * *